(12) United States Patent
Muensterer et al.

(10) Patent No.: US 10,281,574 B2
(45) Date of Patent: May 7, 2019

(54) METHOD FOR ASSESSING A GROUND AREA FOR SUITABILITY AS A LANDING ZONE OR TAXI AREA FOR AIRCRAFT

(75) Inventors: Thomas Muensterer, Tettnang (DE); Matthias Wegner, Friedrichshafen (DE)

(73) Assignee: Hensoldt Sensors GmbH, Taufkirchen (DE)

(*) Notice: Subject to any disclaimer, the term of this patent is extended or adjusted under 35 U.S.C. 154(b) by 825 days.

(21) Appl. No.: 13/193,084

(22) Filed: Jul. 28, 2011

(65) Prior Publication Data

US 2012/0029869 A1   Feb. 2, 2012

(30) Foreign Application Priority Data

Jul. 30, 2010  (EP) .................................. 10007989

(51) Int. Cl.
*G01S 7/41*    (2006.01)
*G01S 7/48*    (2006.01)
(Continued)

(52) U.S. Cl.
CPC .............. *G01S 13/89* (2013.01); *G01S 7/411* (2013.01); *G01S 7/4802* (2013.01); *G01S 13/94* (2013.01);
(Continued)

(58) Field of Classification Search
CPC ........... G01S 13/94; G01S 17/93; G08G 5/02; G01B 21/30
(Continued)

(56) References Cited

U.S. PATENT DOCUMENTS 4,781,465 A * 11/1988 Demachi et al. ............. 356/602
5,324,594 A *  6/1994 Yasuda et al. ................ 428/659
(Continued)

FOREIGN PATENT DOCUMENTS

DE   10 2004 051 625 B4   8/2006
EP       2 166 372 A1      3/2010
(Continued)

OTHER PUBLICATIONS

Dylan Klomparens, "Automated Landing Site Evaluation for Semi-Autonomous Unmanned Aerial Vehicles" Internet Citation, Thesis submitted to the faculty of the Virginia Polytechnic Institute and State University in partial fulfillment of the requirements for the degree of master of Science in Computer Engineering, Aug. 20, 2008, pp. 1-78, XP00259083.
(Continued)

*Primary Examiner* — Michael J Dalbo
(74) *Attorney, Agent, or Firm* — Crowell & Moring LLP

(57) ABSTRACT

A method for assessing a ground area for suitability as a landing zone or taxi area for aircraft is provided. Three-dimensional data for the ground area in a plurality of measurement cycles in a 3D sensor is produced. The measured-value density of the three-dimensional data and also of at least one further statistical property of the three-dimensional data is determined. A measure of the local roughness of the ground area is produced based on the measured-value density and the at least one further statistical property. The individual area elements of the ground area are classified on the basis of the roughness values produced according to the degree of suitability of said area elements as a landing area or taxi area.

11 Claims, 6 Drawing Sheets

(51) Int. Cl.
  *G08G 5/00* (2006.01)
  *G01S 13/89* (2006.01)
  *G01S 13/94* (2006.01)
  *G01S 17/89* (2006.01)
  *G01S 17/93* (2006.01)

(52) U.S. Cl.
  CPC .............. *G01S 17/89* (2013.01); *G01S 17/93* (2013.01); *G01S 17/936* (2013.01); *G08G 5/0086* (2013.01)

(58) Field of Classification Search
  USPC .................................................. 702/155, 159
  See application file for complete search history.

(56) References Cited

U.S. PATENT DOCUMENTS

| 5,593,114 | A | * | 1/1997 | Ruhl ............................. 244/183 |
| 5,644,386 | A | * | 7/1997 | Jenkins et al. ............... 356/4.01 |
| 6,167,144 | A | | 12/2000 | Nishiguchi et al. |
| 6,311,108 | B1 | * | 10/2001 | Ammar et al. ................. 701/16 |
| 2006/0087452 | A1 | | 4/2006 | Scherbarth |
| 2006/0147125 | A1 | * | 7/2006 | Caviedes ...................... 382/266 |
| 2008/0243383 | A1 | * | 10/2008 | Lin ................................ 701/213 |
| 2009/0185741 | A1 | * | 7/2009 | Nahari et al. ................. 382/154 |
| 2010/0021052 | A1 | * | 1/2010 | Wellington et al. .......... 382/154 |
| 2010/0073198 | A1 | | 3/2010 | Wegner et al. |
| 2010/0121577 | A1 | * | 5/2010 | Zhang et al. ................. 701/301 |
| 2010/0156758 | A1 | * | 6/2010 | Anders ........................... 345/8 |
| 2010/0204919 | A1 | * | 8/2010 | Becker et al. ................. 702/5 |

FOREIGN PATENT DOCUMENTS

| EP | 2 182 326 A1 | 5/2010 |
| EP | 2 194 361 A1 | 6/2010 |
| WO | WO 2008/018906 A2 | 2/2008 |

OTHER PUBLICATIONS

European Search Report including partial English translation dated Jan. 12, 2011 (Eleven (11) pages).

* cited by examiner

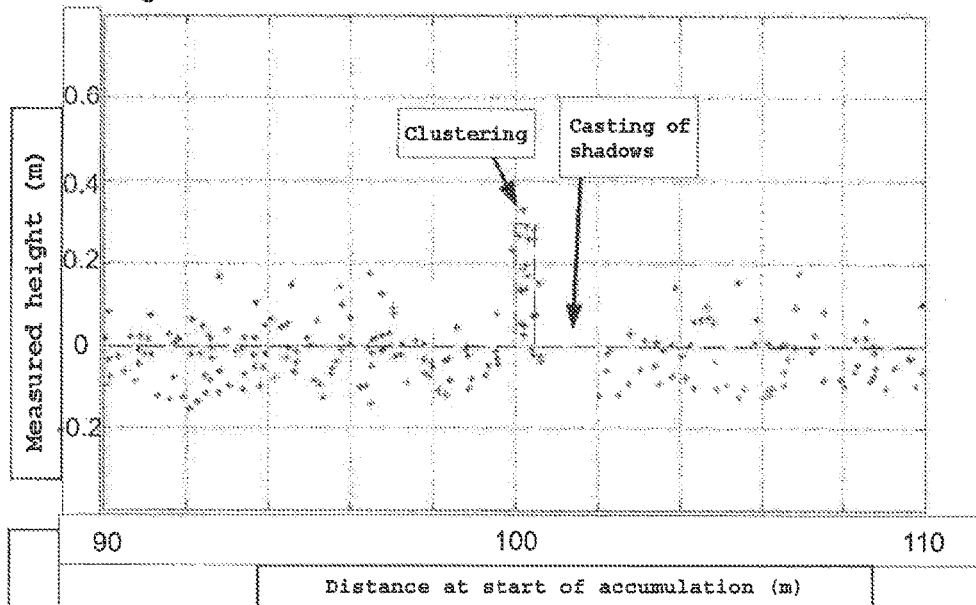
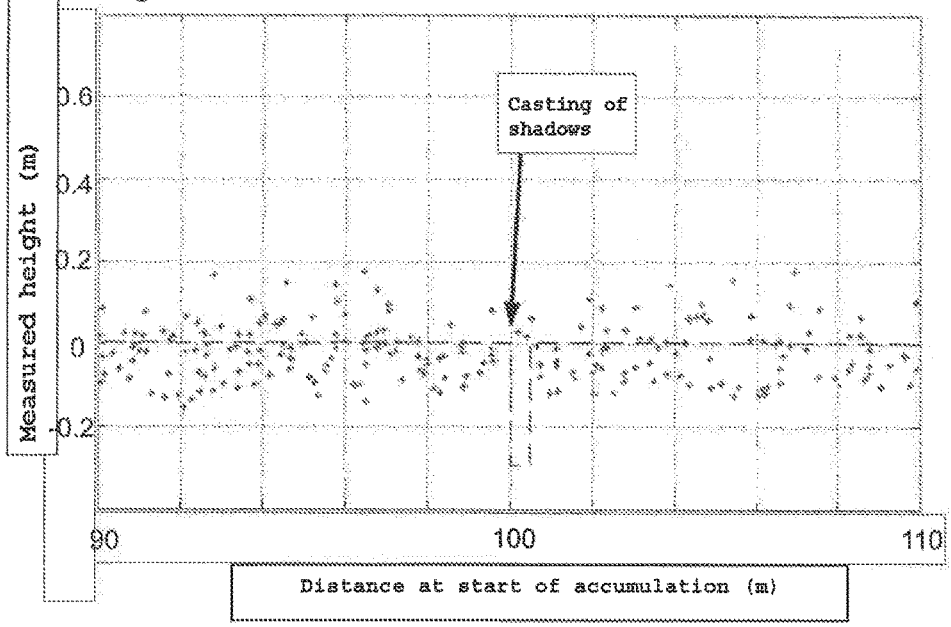

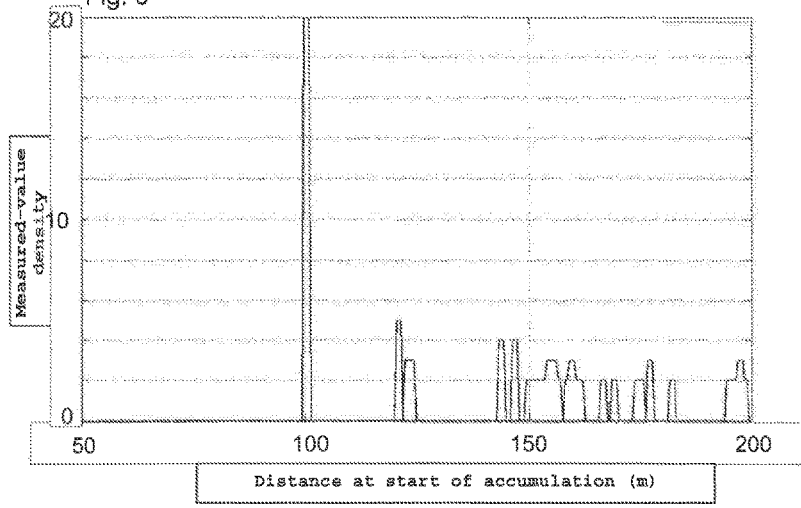
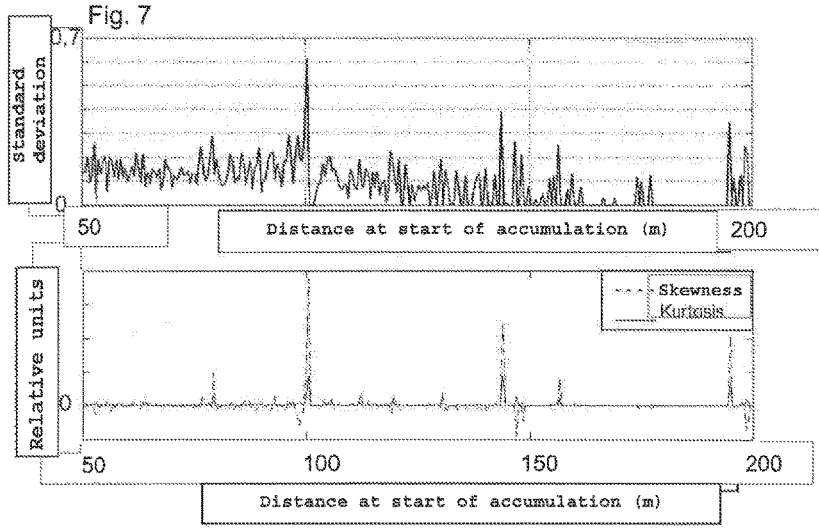

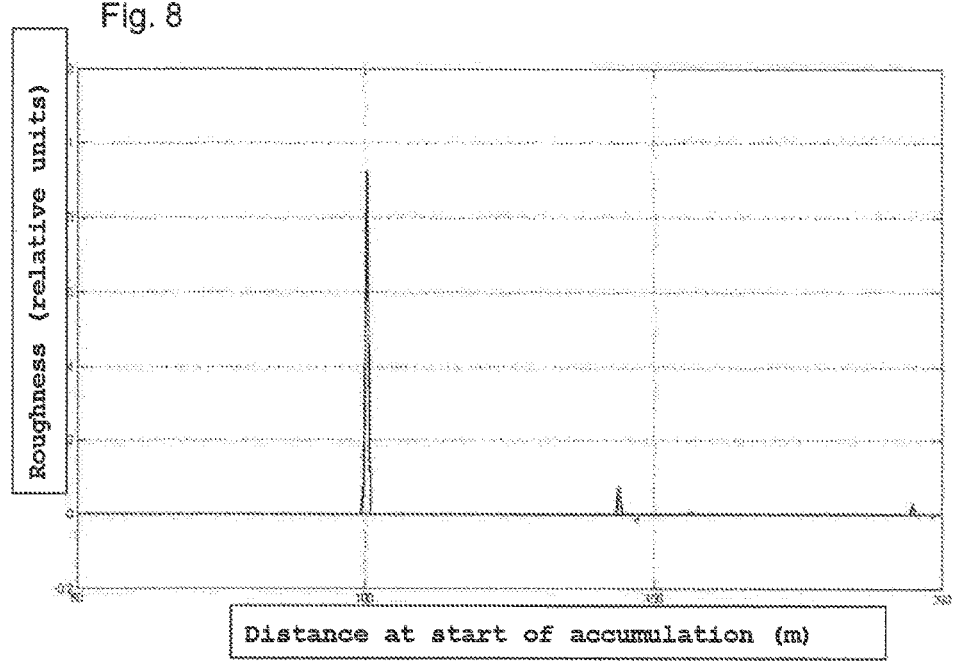

METHOD FOR ASSESSING A GROUND AREA FOR SUITABILITY AS A LANDING ZONE OR TAXI AREA FOR AIRCRAFT

CROSS REFERENCE TO RELATED APPLICATIONS

The present application claims priority under 35 U.S.C. § 119 to European Patent Application No. 10 007 989.6, filed Jul. 30, 2010, the entire disclosure of which is herein expressly incorporated by reference.

BACKGROUND AND SUMMARY OF THE INVENTION

The invention relates to a method for assessing a terrain surface for suitability as a landing area or taxi area for aircraft.

Synthetic vision systems are being increasingly used for landings under restricted visibility conditions. These are intended to provide the most realistic possible representation of the actual circumstances in the landing zone and, in this context, particularly on the ground surface. The data sources used are either databases containing map material (e.g. DTED elevation databases) and/or active 3D sensors, which survey the landing zone before and/or during the landing operation. These data are then numerically processed and visually displayed. The application of such synthetic vision systems has been proposed for helicopter landings under brownout/whiteout conditions or under otherwise severely reduced visibility conditions. In this context, it is crucial that besides the pure, most precise possible geometric properties of the landing zone, such as the inclination thereof relative to the horizontal plane, any obstacles are also represented correctly and with an exact position.

Similar requirements apply to automatic landing systems, both for helicopters and for fixed-wing airplanes. In this case, there is also a need to obtain precise information about the landing zone or the landing strip (position in space and quality) and to guarantee freedom from obstacles.

German patent document number DE 10 2004 051 625 B4 outlines a general approach to the general solution to the brownout problem. This involves the use of a high-resolution 3D sensor to produce a 3D representation of the landing zone during the landing approach. After the brownout situation is entered, no further new data are recorded. On the contrary, the existing data are presented as a synthetic view of the landing zone with the helicopter movement.

"Beyond Brownout", Aviation Week & Space Technology, Apr. 6, 2009, pages 44, 45 reports on a project in which fully and semi-automatic landing under brownout conditions was realized. This project involved a scanning millimetre wave radar being developed and tested as a sensor. For the synthetic view produced, data from a terrain database were combined with the data from the millimetre wave radar (the relevant method is described in European patent document number EP 2 182 326 A1). If the sensor detected obstacles in a landing zone, the helicopter was able to change its landing spot automatically or with the assistance of the pilot.

PCT Publication number WO 2008/018906 A2 describes a further method for producing a synthetic view to assist the pilot. In this case, a terrain database forms the basis of the synthetic view. This terrain database has its interpolation points verified by real-time sensor data from one or more distance sensors, and possibly modified.

The known methods have the drawback that available 3D sensors are not capable of achieving sufficiently accurate spatial resolution for the landing area. A limiting effect is produced in this context firstly by the beam divergence of the active sensors (radars and ladars) used and secondly by the accuracy of the distance measurement. Added to this are errors by the navigation system, the data from which are used for geo-referencing the 3D data. Unlike in the case of topographic measurement flights, in which the interleaving of the measurement beams and the perpendicular measurement angle determine the resolution exclusively using the distance resolution of the 3D sensor used, the beam divergence also significantly influences the achievable spatial resolution in the application being considered here, on account of the dragging, acute measurement angle during the final approach.

In commercially available "high-resolution" radar systems, the resolution limit for the detection of objects at close range should be set to approximately 1 m; in commercially available ladar systems, it is between 30 cm and 50 cm on account of the smaller beam divergence. Both resolutions appear to be critical for a safe landing, however. An undetected obstacle of barely a meter would with a high level of probability result in a catastrophic collision for a landing helicopter. Even a rock or trench with a size or depth of 40 cm could result in a landing helicopter overturning.

The known systems are based on taking the individual measured values from the 3D sensors and computing the ground surface of the landing zone by approximation or interpolation and then displaying it. The measurement inaccuracies described above on account of the spatial resolution of the 3D sensors mean that synthetic representation of the ground area by individual area elements requires the measured values within a discrete, local area element either to be averaged or to be usefully approximated using other filters or methods. This results in oversimplification of the measured data, but this is the only way in which the represented ground area becomes sufficiently noise-free. The problem is largely independent of the shape of the area elements. Generally, rectangular or triangular area elements are used which may be either regular, i.e. having a constant grid size, or irregular, i.e. having a changing grid size. A further problem is the size of such local area elements, which is crucial for determining the requisite computation power of the real-time graphics processors required for the presentation. Typical local area element sizes range between one metre and a few metres of edge length at close range below 200 m distance to the aircraft. Smaller obstacles and ground irregularities could only be represented using significantly smaller local area elements. However, this would mean significantly greater computation complexity, which is limited by the real-time capability of the available hardware.

A thesis by DYLAN KLOMPARENS: "AUTOMATED LANDING SITE EVALUATION FOR SEMI-AUTONOMOUS UNMANNED AERIAL VEHICLES", INTERNET CITATION, 20 Aug. 2008 (2008-08-20), pages 1-129, XP002569083, found on the Internet: URL: http://scholar.lib.vt.edu/theses/available/etd-08192008-231631/unrestricted/Thesis.pdf, describes a method in which a 3D sensor in the form of a stereo camera is used to examine the landing zone of a vertical take-off and landing unmanned aerial vehicle (VTOL UAV) for suitability as a landing area. The three-dimensional measured values are used to derive individual area elements for the examined landing zone, and the orientation of the area elements in space is determined. Differences in the spatial orientation of adjacent area elements are used as a measure of the roughness of the terrain, with the thus ascertained measure of the roughness additionally being combined with further statistical properties of the three-dimensional measured values as a plausibility check.

Exemplary embodiments of the present invention provide a method that can be used to obtain up-to-date and highly accurate information about the position and quality of the landing zone or taxi area of the aircraft.

The method according to the invention allows insights about the local properties of the surveyed landing zone or taxi area to be obtained despite the limited spatial resolution of the 3D sensors used by oversampling (i.e., producing 3D data which repeatedly cover the terrain to be surveyed in multiple measurement cycles, e.g., multiple scans or, in the case of a flash ladar, in multiple snapshots) and statistical evaluation. These local properties relating to the ground quality then result in classification, which determines whether or not this area is suitable for landing or as a taxi area. The result can be displayed in a synthetic view of the surveyed landing zone or taxi area as an additional feature—either as a marker, as a texture or as colour coding—of each corresponding local area element. The thus obtained property of each local area element can likewise be transmitted to an automated landing system, which uses this information to plan the landing.

The method according to the invention is particularly suitable for application for rotary-wing aircraft, particularly in order to cope with the critical states of the "brownout" or "whiteout" when taking off or landing on sandy or snow-covered ground.

The principle on which the invention is based is universal, however, and can likewise be used for fixed-wing aircraft. In this case, the intended landing strip for the fixed-wing aircraft is analyzed and rated in a similar fashion in terms of its quality and particularly for the presence of an obstacle. The generally greater distance between the aircraft and the ground area to be surveyed in comparison with a rotary-wing aircraft has no influence on the strategy according to the invention.

Furthermore, the method presented here can be used not only for rating the landing zone or landing strip in a final approach of an aircraft, but also for rating taxiways and parking areas on airfields; that is to say while the aircraft is moving on the ground prior to takeoff or after landing.

All known radar-based or laser-based sensor types can be used as the 3D sensor. Laser radars and high-resolution radars, particularly millimetre wave radars, are particularly suitable.

Other objects, advantages and novel features of the present invention will become apparent from the following detailed description of one or more preferred embodiments when considered in conjunction with the accompanying drawings.

BRIEF DESCRIPTION OF THE DRAWINGS

The invention is explained in more detail below using specific exemplary embodiments with reference to figures, in which:

FIG. 4 shows a Monte Carlo simulation of the measured values for an ideal ground area with a cuboid obstacle (30 cm edge length) of 100 m distance, produced during a landing approach. The dashed line represents the ideal obstacle profile without measurement inaccuracies and measurement errors. Arrows mark the zone of measured value clustering and measured value reduction as a result of the casting of a shadow on the obstacle.

FIG. 5 shows a Monte Carlo simulation of the measured values for an ideal ground area with a cuboid dip (trench) at 100 m distance, produced during a landing approach. The dashed line represents the ideal obstacle profile without measurement inaccuracies and measurement errors. An arrow marks the zone of measured value reduction as a result of the casting of a shadow.

FIG. 6 shows local measured value density for the presence of a simulated raised obstacle (e.g. wooden crate) at 100 m distance.

FIG. 7 shows standard deviation (top graph), skewness and kurtosis (bottom graph) for the presence of a simulated raised obstacle (e.g. wooden crate) at 100 m distance.

FIG. 8 shows roughness—ascertained according to the invention—of the ground area under consideration for the presence of a simulated raised obstacle (e.g. wooden crate) at 100 m distance.

DETAILED DESCRIPTION OF THE DRAWINGS

Figure 1:
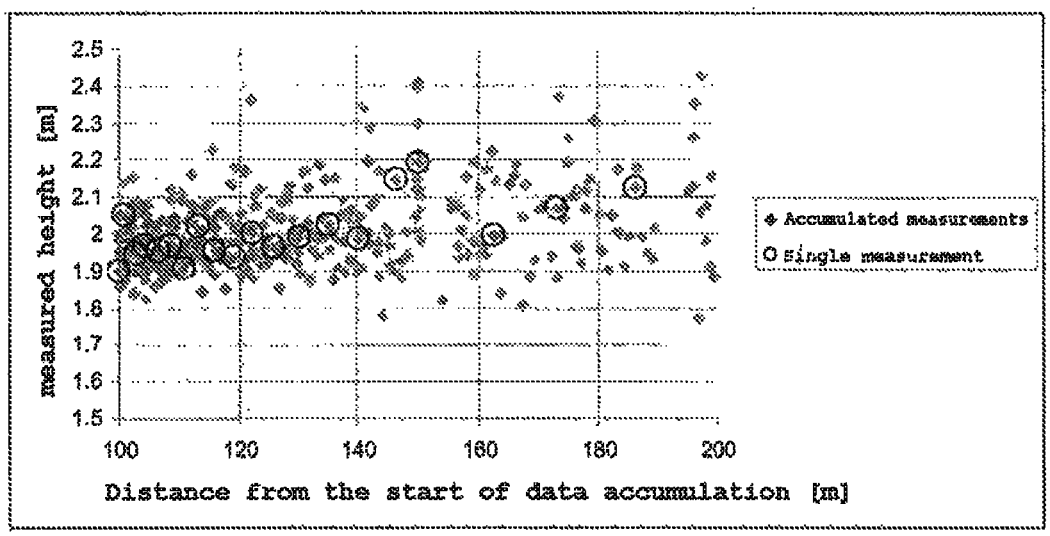
FIG. 1 shows a Monte Carlo simulation of the measured values for an ideally planar ground area with a cuboid obstacle (edge length 0.3 m) at 150 m, produced during a landing approach. This has taken account of measurement errors as a result of inaccuracies in the navigation unit, limited accuracy of the distance measurement and beam divergence in the measurement beam from the 3D sensor. The set of rhombic measurement points are the result of a plurality of successive scans of the ground area performed during the landing approach, while the circular measurement points come from the same scan. The distances on the horizontal axis relate to the distance between the 3D sensor and the relevant point on the ground area at the time of the start of data accumulation.
Figure 2:
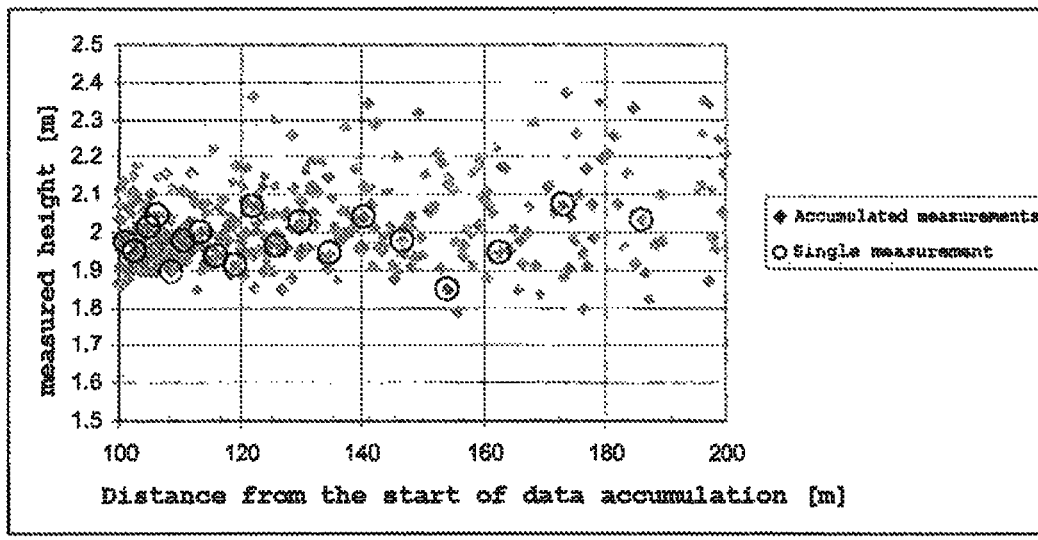
FIG. 2 shows a Monte Carlo simulation of the measured values for the same ideally planar area as FIG. 1, but without a cuboid obstacle, produced during a landing approach. As in FIG. 1, measurement errors as a result of inaccuracies in the navigation unit, limited accuracy of the distance measurement and beam divergence in the measurement beam are taken into account.

As FIGS. 1 and 2 show, conventional methods of approximating or interpolating the ground area fail in the identification of relatively small obstacles because the measured values are severely scattered around the ideal value on account of the finite resolutions and the measurement inaccuracies of the 3D sensors.

On account of the dragging, acute-angled incidence of the measurement beams in the final approach (typically between 10° and 20° in relation to the ground area), special effects are produced which are exploited according to the invention.

This involves the calculation of a measure for characterizing the ground roughness, which measure is explained in more detail below.

The method proposed here ascertains the ground roughness by using a combination of locally limited statistical features of the measured values. The dragging incidence of the measurement beams in relation to the ground surface and the resultant gaps in the measurement data on account of shadowing effects of existing non-ground objects (e.g. rocks or trenches) produces a change in the local measured value densities and also a change in the higher-order statistical features, such as variance, skewness and kurtosis. These statistical features are therefore suitable for characterizing the ground area in terms of its suitability as a landing spot.

Figure 3:
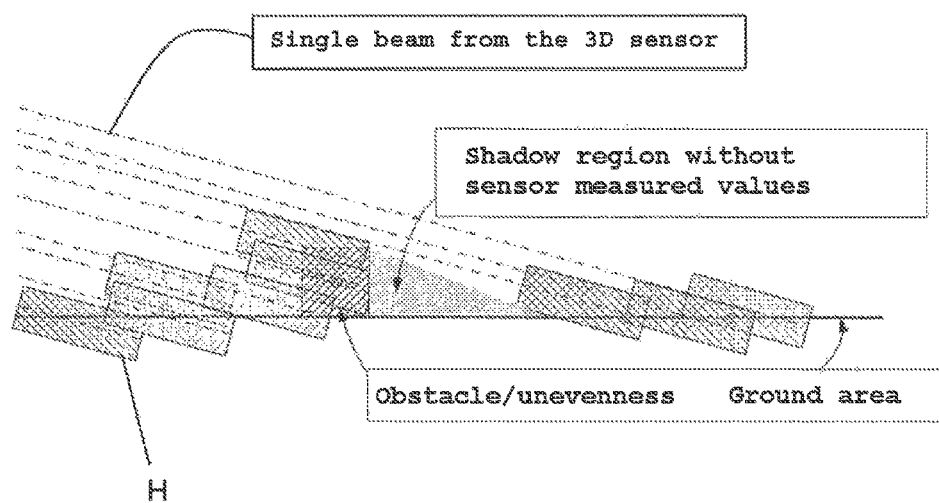
FIG. 3 shows a schematic illustration of the measured values for an ideal ground area with a cuboid obstacle given finite measurement accuracy in the 3D sensor. The associated (ideal) single beams from the 3D sensor are shown in each case. The measurement inaccuracy is indicated by the presentation of a measured value in the form of a rectangle H, the length of the rectangle representing the measurement inaccuracy for the distance measurement and the width of the rectangle representing the measurement inaccuracy on account of the finite beam divergence.

FIGS. 3 and 4 are each based on an ideally planar ground area with a raised obstacle (e.g. wooden crate) (in the illustration in FIG. 4, the obstacle is located at a coordinate value on the horizontal axis of 100 m). When a raised obstacle is present, an increase in the local measured value density is inevitably followed by a corresponding reduction as a result of the gap in the measured values in the "shadow region" of the scanned obstacle. The basic illustration in FIG. 3 shows this casting of a shadow in the sensor data on account of the obstacle.

FIG. 4 shows the sensor measured values for the same situation in the case of a simulated approach to the ground area. In contrast to FIG. 3, the illustrated measured values for the ground area have been produced by repeated, successive scanning of the ground area by the 3D sensor in order to obtain an improved database for the subsequent statistical evaluations. It can be seen that behind the raised obstacle a shadow region with missing measured values is appearing. By contrast, the measured value density increases on the front of a raised obstacle.

This principle of increased measured value density in the case of a raised obstacle conversely also applies when a trench is present. At the location of the trench, a reduction in the measured value density is obtained as a result of the casting of a shadow at the edge of the trench. However, the size of the shadow cast is generally smaller. The distribution of the sensor measured values for this situation is shown in FIG. 5.

According to the invention, these properties are taken as a basis for ascertaining the local measured value density, for example by sliding summation of the measurement points per area element. Indications of raised objects on the landing area are obtained from these values as a result of the typical sequence of local measured value clustering with successive local measured value reduction. Indications of trenches are obtained on the basis of the converse effect, as explained.

As a result of logic combination with further statistical properties of the three-dimensional terrain data, e.g. variance, skewness, kurtosis, the invention ascertains a measure of the local roughness of the ground area, which provides a reliable indicator of the presence of obstacles.

Advantageously, the local roughness value R(x) is calculated in the form $$R(x) = \sum_1^p w_i \cdot S_i(x) \text{ or } R(x) = \prod_1^p w_i.$$

$S_i(x)$ over all p selected features $S_i$ (measured value density and further statistical properties, such as variance, skewness, kurtosis, etc.), where $w_i$ describes a weighting factor for the statistical property $S_i$. In principle, combinations of the two proposed calculation methods (additive and multiplicative) are also possible. The thus obtained roughness value serves as an input variable for a numerical classifier which categorizes the corresponding, local area element in one of the two grades "suitable for landing" or "not suitable for landing" on the basis of the roughness. In this case, the classification is performed particularly on the basis of a comparison between the current roughness value and a predefined threshold value. In the case of the present calculation method according to the invention, appropriate intermediate grades accounting for discrete graduations between the two extreme grades (a) "suitable for landing" and (b) "not suitable for landing" are also conceivable. In this case, a corresponding plurality of threshold values corresponding to the individual grades are used.

Besides the cited statistical properties, it is also possible for other local properties of a stochastic data record to provide input variables for assessing the roughness of the ground and hence to be used for classifying the landing area according to the invention.

The relevant criteria should advantageously be attuned to the properties, i.e., the measurement inaccuracies and hence the underlying stochastic processes, of the respective sensor.

The higher-order statistical moments suitable for the method according to the invention—variance, skewness and kurtosis—are defined generally by $$m_n = \langle (h - \langle h \rangle)^n \rangle,$$

wherein n denotes the order of the moment (e.g., n=2 for variance) and the angular brackets, as is generally customary, denote the mean or expected value. In our situation, the variable h denotes the z component of the 3D measured values. For discrete measured values, the following is obtained for the one-dimensional problem, without restricting generality:

$$m_n = \sum_{i=a}^b (h_i - \langle h \rangle)^n, \text{ where } \langle h \rangle = \frac{\sum_{i=a}^b h^i}{b-a}$$

is the mean between the indices a and b over the discrete height values $h_i$.

In practice, it is found to be advantageous to limit the averaging and calculation windows not by the number of measured values but rather by spatial criteria, i.e., distances.

Since the problem described involves the need to find locally highly limited disturbances on an actually planar area, the method according to the invention prefers different averaging ranges for calculating the mean of the high distribution, on the one hand, and calculating the associated statistical moments, on the other hand;

$$m_n = \sum_{i=a+x}^{b-x} (h_i - \langle h \rangle)^n, \text{ with } \langle h \rangle = \frac{\sum_{i=a}^b h^i}{b-a},$$

wherein an averaging range for the higher-order statistical variables is chosen which is 2·x smaller than for the expected value.

By way of example, the manner of ascertaining the roughness R(x), which forms the input variable for the classification, will be shown using the example of the simulation of a wooden crate at 100 m distance, which is shown in FIG. 4. The following calculation sequence is used as a measure of the measured value density:

1. Calculate the number of measurement points in a local region, $\hat{d}_i$
2. Look for peaks in the local number of measurement points, followed by zero values in this number of measurement points $$d_i = \begin{cases} \hat{d}_i, & \text{if } \hat{d}_i > \text{thresh}_{peak} \wedge \hat{d}_{i+1} < \text{thresh}_s \\ 0 & \text{else,} \end{cases}$$

where $\text{thresh}_{peak}$ represents a minimum value (threshold value) for a peak at the front edge of an obstacle and $\text{thresh}_s$ represents a maximum value (threshold value) for measured values in the shadow region of the obstacle.

FIG. 6 shows the local measurement point density ascertained in this manner over the distance coordinate.

The higher statistical moments for the same simulated coordinate range are shown by the subsequent FIG. 7.

If the roughness defined above is calculated from these variables as a product of the statistical single variables of local measured value density, local standard deviation and local skewness, the values shown in FIG. 8 are obtained. The pronounced peak can be seen at the location of the obstacle at the coordinate 100 m.

Instead of calculating a complex measure of roughness that is then rated using a conventional classifier, it is alternatively possible for the local measured value density and statistical properties for the individual area elements of the ground area selected for landing also to be used directly as input variables for a neural network or a fuzzy-logic classifier.

The result of the method according to the invention both when a conventional classifier is used and in the latter case of using a neural network or a fuzzy-logic classifier is local categorization or classification of the ground area. In the simplest case, there may thus be just two classes permitted for each area element, that is to say "suitable" or "not suitable". In a further embodiment, intermediate grades are also permitted in order to classify the degree of suitability from "totally unsuitable" through multiple intermediate grades to "highly suitable".

This categorization of each area element can be used for intuitively presenting the entire ground area or landing area on the basis of the local ground quality in a synthetic vision system.

Various embodiments are useful in this context, depending on the application. Thus, a single area element categorized as "unsuitable" can result in the entire ground area or landing area being identified as "unsuitable" in the representation. By contrast, it may be useful for other applications if the indication of the entire ground area or landing area is "unsuitable" is not chosen until a sufficient number of area elements have been categorized as "unsuitable" or "potentially unsuitable" by the classification method according to the invention.

Figure 9:
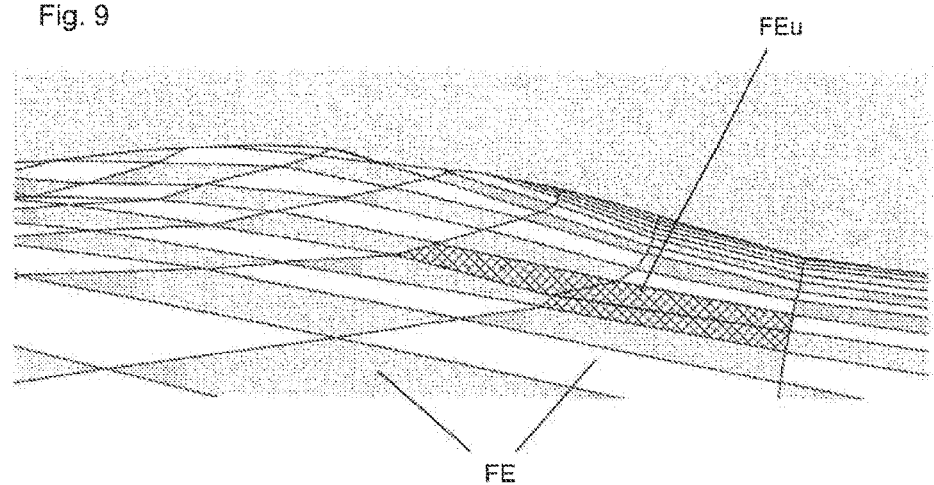
FIG. 9 shows a representation of a ground area with marked regions of increased roughness, which are not suitable for landing an aircraft.

The suitability for landing is then overlaid on the representation of the relevant area element as a marker, texturing, colouring or other identification. FIG. 9 shows an example of this. In this example, the represented terrain is shown in the form of individual, square area elements FE with alternate grey-white coloured marking in the manner of a draughtboard pattern. The area elements FEu classified—according to the invention—as "unsuitable" are shown in hatched form, this hatching being overlaid on the draughtboard pattern.

Figure 10:
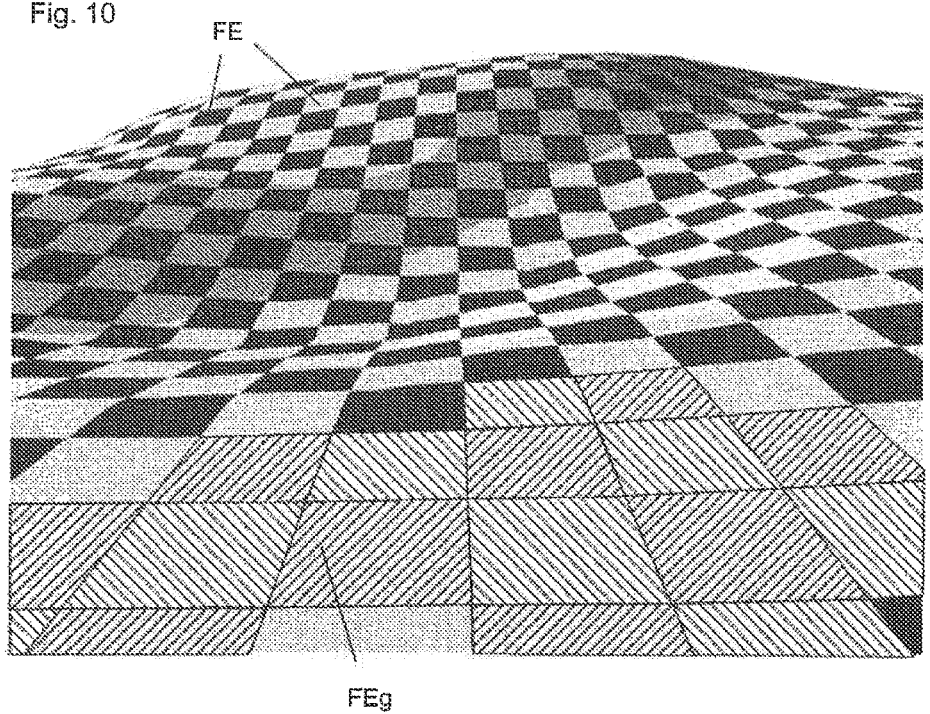
FIG. 10 shows a representation of a ground area with marked regions suitable for landing an aircraft, since the measured roughness in the relevant area elements is below a particular value.

An inverse representation in comparison with FIG. 9 may also be advantageous. Such an embodiment is shown in FIG. 10. In this case, only those area elements FE which, on account of their low roughness calculated according to the invention, have been classified as suitable for landing are specifically marked. In the example in FIG. 10, the area elements FEg categorized as "suitable" are identified by means of hatching.

The method according to the invention is—contrary to the current trend for graphical representations on "Synthetic Vision Displays" in aircraft—not focused on displaying ever further particulars and details, and of the highest resolution possible. On the contrary, the invention takes the opposite direction, i.e., it proposes a highly simplified, symbol-based view with clear marking of suitable, obstacle-free and unsuitable subareas. In this respect, the invention is based on the concept of intensified abstraction and reduction of the information that is to be presented to the bare essentials.

In one particularly advantageous embodiment, the classification values produced according to the invention for the area elements can also be transferred to an automatic landing system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for assessing a ground area for suitability as a landing zone or taxi area for aircraft via a synthetic vision system, comprising:
    producing three-dimensional data for the ground area by repeated, successive scanning of the ground area in a plurality of measurement cycles using a radar-based or laser-based 3D sensor that generates measurement beams having an acute angle of incidence on the ground area;
    determining a spatial measured-value density of the three-dimensional data and at least one further statistical property of the three-dimensional data, wherein the spatial measured-value density represents an amount of measurement points per area element over the plurality of measurement cycles;
    producing, based on the determined spatial measured-value density and the at least one further statistical property, a measure of a local roughness of the ground area by logically combining the measured-value density with the at least one further statistical property of the three-dimensional data, the logical combination being addition, multiplication or a combination of addition and multiplication;
    classifying, using a numerical classifier, individual area elements of a synthetic model of the ground area based on the produced local roughness values according to a degree of suitability of the individual area elements as a landing area or taxi area; and
    modifying the synthetic model according to the numerical classifier associated with each individual area element via the synthetic vision system,
    wherein producing the measure of the local roughness of the ground area includes identifying individual area elements associated with a shadow region resulting from the acute angle of incidence of the measurement beams.

2. The method according to claim 1, wherein the at least one further statistical properties used for the three-dimensional data are a statistical moment where n >2 in accordance with the following formula:

$$m_n = \langle (h - \langle h \rangle)^n \rangle, \text{ where}$$

$\langle h \rangle$ is the mean of the three-dimensional data h.

3. The method according to claim 2, wherein a range of values for the three-dimensional data h is chosen to be smaller for calculating the mean $\langle h \rangle$ than for calculating the associated statistical moment $m_n$.

4. The method according to claim 1, wherein classification values for the individual area elements are used for producing a synthetic view of the ground area.

5. The method according to claim 4, wherein the individual area elements that are suitable as a landing area or taxi area are identified in the synthetically produced view of the ground area.

6. The method according to claim 4, wherein the individual area elements that are not suitable as a landing area or taxi area are identified in the synthetically produced view of the ground area.

7. The method according to claims 4, wherein the entire ground area is identified as not suitable in the synthetically produced view of the ground area when a particular minimum number of area elements n, where n≥ 1, is reached or exceeded which have been classified as not suitable as a landing area or taxi area.

8. The method according to claim 1, wherein classification values for the individual area elements are transferred to an automatic landing system.

9. The method according to claim 1, wherein measurements of the measurement cycles are performed from the aircraft at an acute-angled incidence with respect to the ground area.

10. The method according to claim 9, wherein when a depression relative to the ground area is in the three-dimensional data the determined spatial measured-value density decreases in a location of the depression in the three-dimensional data and increases in a location in the three-dimensional following the depression in the three-dimensional data.

11. The method according to claim 1, wherein the shadow region comprises a reduction in spatial measured-value density of the three-dimensional data produced by the acute angle of incidence of the measurement beams on the ground area.

* * * * *